United States Patent
Schaefer

(10) Patent No.: US 6,272,970 B1
(45) Date of Patent: Aug. 14, 2001

(54) MOTOR-AND-PUMP UNIT FOR A VEHICLE HYDRAULIC BRAKE SYSTEM

(75) Inventor: Ernst-Dieter Schaefer, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/422,263

(22) Filed: Oct. 21, 1999

(30) Foreign Application Priority Data

Oct. 28, 1998 (DE) .............................................. 198 49 669

(51) Int. Cl.$^7$ ................................ F16C 19/50; F01B 1/00
(52) U.S. Cl. ................................ 92/72; 384/447; 384/564
(58) Field of Search ........................ 92/72, 129; 384/447, 384/564, 569; 417/470, 471

(56) References Cited

U.S. PATENT DOCUMENTS

| | | | |
|---|---|---|---|
| 4,730,995 | 3/1988 | Dewhirst | 418/1 |
| 5,074,393 | 12/1991 | Itomi | 192/45 |
| 5,382,099 | 1/1995 | Bauer et al. | 384/454 |
| 5,668,422 | 9/1997 | Deynet | 310/71 |

FOREIGN PATENT DOCUMENTS

| | | |
|---|---|---|
| 215084 | 2/1923 | (GB) . |
| 2263318 | 1/1993 | (GB) . |
| WO 98/16986 | 8/1997 | (WO) . |

*Primary Examiner*—Edward K. Look
*Assistant Examiner*—Michael Leslie
(74) *Attorney, Agent, or Firm*—Ronald E. Greigg; Edwin E. Greigg

(57) ABSTRACT

A motor-and-pump unit having an electric motor in combination with a housing of the pump. The pump has at least one displaceable pump piston. To that end, on the side toward the pump housing and originating at one end wall, the electric motor has a bearing neck, which is tubular and into which the pump housing protrudes. This bearing neck fixes an outer ball bearing race of a ball bearing for a shaft of the electric motor. Protruding from the ball bearing is a shaft end that carries an eccentric element for moving the at least one pump piston. The eccentric element is disposed at an axial spacing from an inner ball bearing race that surrounds the shaft in stationary fashion. The eccentric element is brought directly up to the inner ball bearing race, and the inner ball bearing race and the eccentric element are embodied as a one-piece, multifunctional component. This one-piece construction offers the advantage that both the inner ball bearing race and the eccentric element firmly surround the end of the shaft like a reinforcing sleeve and thus reinforce this shaft end. Furthermore, bringing the eccentric element close to the ball bearing reduces the bending moment that tends to cause warping.

4 Claims, 2 Drawing Sheets

MOTOR-AND-PUMP UNIT FOR A VEHICLE HYDRAULIC BRAKE SYSTEM

BACKGROUND OF THE INVENTION

The invention relates to a motor-and-pump unit.

From U.S. Pat. No. 5,348,382, a hydraulic piston pump for an anti-lock system of a hydraulic vehicle brake system is known. The piston pump has a driving shaft, an eccentric element disposed on and rotatable by this shaft, and two pump pistons disposed to be displaceable diametrically to the shaft and thus in alignment with the eccentric element. The eccentric element is embodied as an inner bearing bush, shaft from sheet metal, and a thermoplastic support body between this inner bearing bush and the driving shaft. Roller bodies are disposed around the inner bearing bush, and in turn are surrounded by an outer bearing bush; the outer bearing bush transmits reciprocating motions, originating at the eccentric element and transmitted by the roller bodies to the outer bearing bush, to the pump pistons. An inner cylinder liner of a shaft bearing of the driving shaft is also embodied in one piece with the inner bearing bush of the eccentric element. The inner cylinder liner of the shaft bearing is likewise surrounded by cylindrical roller bodies, which in turn are also surrounded by an outer bearing bush, which rests in a housing of the piston pump. This shaft bearing generates only radial bearing forces, so that for axially fixing the position of the shaft, an axial bearing is needed in addition. This axial bearing may for instance be formed by one face end of the driving shaft and by an associated axial stop body, which makes this kind of axial bearing a slide bearing.

From international patent disclosure WO 98/16986, a motor-and-pump unit with an electric motor is known; the electric motor has a motor housing with two end walls, and in the end walls magnets and an armature with a shaft and two shaft bearings, at least one of which is embodied as a ball bearing with an outer ball bearing race and an inner ball bearing race and balls located between them; the outer ball bearing race is retained in a tubular bearing neck, which protrudes outward from one of the two end walls. This motor-and-pump unit also includes a pump, with a pump housing mounted on the end wall that has the bearing neck; at least one pump piston can be displaced in this pump housing, in a transverse alignment with the longitudinal axis of the shaft, by means of an eccentric element, disposed inside the pump housing, that is secured to one shaft end protruding from the ball bearing and forms a raceway for cylindrical roller bodies; the roller bodies are surrounded by an outer roller bearing bush, and the outer roller bearing bush, upon rotation of the shaft with the attendant reciprocating motions of the eccentric element, displaces the pump pistons. The eccentric element is disposed at an axial spacing from the inner ball bearing race. A collar, for example, protruding radially inward from the ubular bearing neck dips into this axial spacing. On the one hand the collar forms an axial stop for the outer ball bearing race, and on the other, the collar acts as an axial stop face for the outer roller bearing race of the eccentric element. This motor-and-pump unit is once again a component of a hydraulic vehicle brake system, and accordingly it cannot be precluded that the load on the eccentric element and thus the bending stress on the shaft, and its elastic warping, will be caused by the high brake pressure to be generated. Since as already noted this motor-and-pump unit is a component of a vehicle, its individual parts should on the one hand be lightweight but on the other so rigid that elastic deformation of the components will not make unpleasant noise.

OBJECT AND SUMMARY OF THE INVENTION

The motor-and-pump unit has the advantage of a more-compact design in the region of the ball bearing and the eccentric element. The characteristics set forth have an advantage that the ball bearing and the eccentric element, together with the roller bodies surrounding it and the outer bearing race surrounding them, form a structural group that can be produced as a complete unit, which can be united with the shaft of the electric motor in a single pressing operation, at the site where the electric motor is assembled. It can be appreciated that this makes for faster and hence less expensive assembly. The material selected for seating the balls is advantageously also used for seating the roller bodies on the eccentric element.

The characteristics set forth offer a further advantage that a ball bearing race and the eccentric element formed in one piece with the ball bearing race form a tubular reinforcing sleeve, which tautly surrounds the end of the shaft and thus assures less warping of the shaft end at a predetermined load. The characteristics set forth are accordingly also one provision for reducing elastic warping of the shaft.

The motor-and-pump unit has the advantage that because the distance between the shaft bearing, embodied as a ball bearing, and the longitudinal axes of the pump pistons, of which there are for instance two, is shortened, less bending moment is exerted on the shaft, and accordingly there is less elastic warping, while the sound-radiating surfaces of the components of the motor-and-pump unit execute shorter strokes.

Advantageous refinements of and improvements in the motor-and-pump unit defined hereinafter are possible with the provisions recited therein.

The characteristics set forth offer an advantage that the distance between the shaft bearing, embodied as a ball bearing, and the longitudinal axes of the pump pistons is shortened, and therefore less bending moment is exerted on the shaft, and accordingly there is less elastic warping, while the sound-radiating surfaces of the components of the motor-and-pump unit execute shorter strokes.

The characteristics set forth offer an advantage of still further reducing elastic warping of the shaft.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
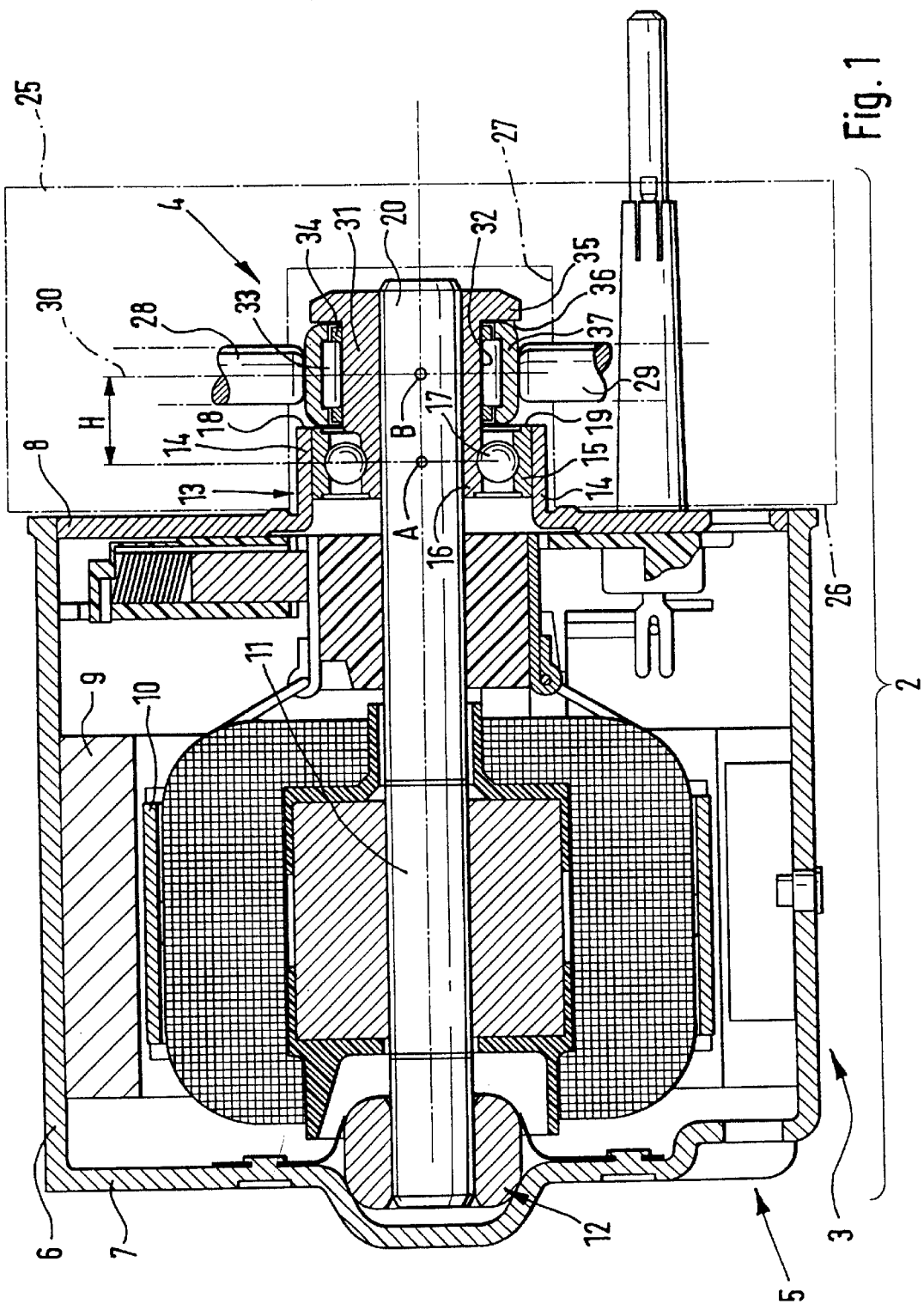
FIG. 1 shows a first exemplary embodiment of the invention in longitudinal section.
Figure 2:
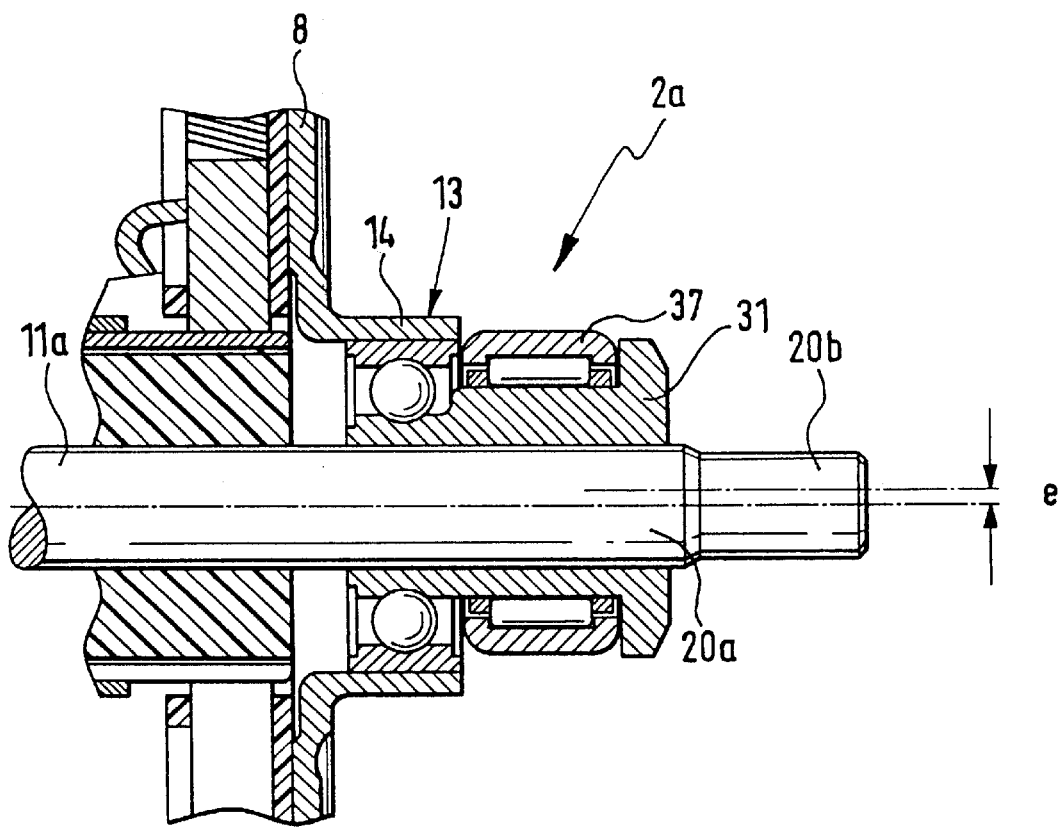
FIG. 2 shows a second exemplary embodiment, which differs in one detail from the exemplary embodiment shown in FIG. 1.

The first exemplary embodiment of the motor-and-pump unit 2 according to the invention, shown in FIG. 1, is embodied largely identically to the motor-and-pump unit of WO 98/16986 discussed above, and so a simpler explanation of the motor-and pump unit 2 will suffice.

The motor-and-pump unit 2 comprises an electric motor 3 and a pump 4 put together with the motor.

The electric motor 3 has a motor housing 5 with a circumferential wall 6, an end wall 7; a further end wall 8, and at least one field magnet 9, an armature 10, a shaft 11 carrying the armature 10, and two shaft bearings 12, 13 are accommodated in the motor housing 5. The motor housing 5 is embodied as a so-called pot housing, for example, because one end wall 7 is embodied in one piece with the circumferential wall 6. To enable putting the electric motor 3 together, the second end wall 8 is logically embodied as a cover for the pot. In a manner that can be inferred from the prior art, the first end wall 7 is shaped by a deep-drawing or die-stamping operation, in such a way that the first end wall receives the shaft bearing 12, which is embodied as a so-called cap-shaped or hemispherical slide bearing, in tiltable fashion. Concentrically with the circumferential wall 6, the second end wall 8 has a tubular bearing neck 14 protruding in the direction toward the pump 4. In this bearing neck 14, the shaft bearing 13 is fixed both radially and axially. The shaft bearing 13 is embodied as a ball bearing and has an outer ball bearing race 15, an inner ball bearing race 16, and balls 17 between them. The axial fixation of the outer ball bearing race 15 inside the bearing neck 14 is done by a press fit and thus with frictional engagement. The bearing neck 14 is bounded by an annular face end 18. Pointing away from the electric motor 3, the outer ball bearing race 15 has face end 19. In this exemplary embodiment, the two face ends 18 and 19 are in the same reference plane, as is shown in FIG. 1. To make the pump 4 drivable, the shaft 11 has a shaft end 20 that protrudes out of the bearing neck 14 and also from the shaft bearing 13.

In FIG. 1, the electric motor 3 is shown as a so-called collector brush motor, but for driving the pump 4 it is also possible as an alternative to use an electric motor without any collector or brushes. For instance, the electric motor can be embodied as a brushless direct-current motor with electronic commutation.

The pump 4 has a pump housing 25, shown only symbolically here, which is block-shaped for instance and which has a face end 26, at which a hollow chamber 27 originates and from which this chamber extends into the pump housing 25. This face end 26 is intended to be put together with the electric motor 3, or its second end wall 8 that has the bearing neck 14. The diameter of the hollow chamber 27 is selected such that there is room for the bearing neck 14. In the longitudinal direction of the shaft end 20, the hollow chamber 27 is designed such that there is room for the length of shaft end 20.

In a manner that can be learned for instance from the prior art with regard to anti-lock brake systems, the pump 4 has two pump pistons 28, 29, which are shown only in fragmentary form. As can be seen from FIG. 1, the pump pistons 28 and 29 are for instance disposed along a common axis 30, and this axis 30 is disposed so that the axis intersects the shaft end 20 at a right angle. An eccentric element 31 is disposed in alignment with this axis 30, about the shaft end 20. The eccentric element 31 has a cylindrically bounded raceway surface 32 for cylindrical roller bodies 33, which are retained in the intended mutual orientation by means of a cage 34, for example. Toward the free end 20 of the shaft, the eccentric element 31 has a radially outward-pointing rim 37, which has an axial stop face 36 aimed at the cage 34. Between this axial stop face 36 and the face end 18 of the bearing neck 14, or the face end 19 of the outer ball bearing race 15, there is an outer roller bearing race 37 that surrounds the cylindrical roller bodies 33. The dimensions in the axial direction are selected such that, as shown in FIG. 1, there is a slight axial displaceability of the outer roller bearing race 37 between the axial stop face 36 and at least the face end 19 of the outer ball bearing race 15, to prevent jamming.

As shown in FIG. 1 for instance, the inner ball bearing race 16 and the eccentric element 31 are embodied as an integral component, which accordingly gaplessly surrounds the shaft end 20 over its entire length between the balls 17 and the bearing race of the eccentric element 31, in the manner of a reinforcing sleeve. As can be seen from FIG. 1, in comparison with the moment of inertia that counteracts and is specified by the diameter of the shaft 11 or its end 20, the moment of inertia that counteracts bending of the integral component and is defined by the tubular cross section is quite high. Since the integral component, that is, the inner ball bearing race 16 and the eccentric element 31, are in a press-fitted connection with the shaft end 20, a construction with very high flexural strength is thus obtained between the points marked A and B on the shaft 11 and its end 20. Point A is located in a reference plane, defined by the centers of the balls 17, that passes transversely through the shaft 11, and point B is determined by the aforementioned axis 30, along which the pump pistons 28 and 29 are aligned. It can thus be appreciated that a lever arm H with a length corresponding to the distance between points A and B is shorter than in the prior art defined by WO 98/16986. Consequently, any elastic warping of the shaft end 20 between the reference points A and B will be less than with the longer lever arm of the prior art. This advantage is attained regardless of whether the inner ball bearing race 16 and the eccentric element 31 are embodied in one piece, as shown in FIG. 1, or not. It can thus be seen that the bending moment reduction effected by shortening the lever arm H, with the attendant reduction in warping, is made still more effective by the aforementioned one-piece embodiment and the resultant stiffening. In the example shown in FIG. 1, two provisions are accordingly employed simultaneously. It is freely up to one skilled in the art whether to reduce both these provisions simultaneously, or only one of the two, to practice. He can do this by making use of the ball bearing and the separate eccentric element as in WO 98/16986.

In the exemplary embodiment shown in FIG. 1, the outside diameters of the outer ball bearing race 15 and the outer roller bearing race 37, which is disposed around the eccentric element 31, are made practically the same size. Given a typically selectable eccentricity, or if the eccentricity is modified, the result is then an alignment of the outer bearing race 37 relative to the outer ball bearing race 15 as can be seen above points A and B in FIG. 1.

The second exemplary embodiment for a motor-and-pump unit 2a is shown only in fragmentary form, because the second face end 8 with the bearing neck 14, the shaft bearing 13, and the eccentric element 31, as well as the outer roller bearing race 37 around the eccentric element 31, are all identical to their counterparts in the first exemplary embodiment. The only difference is the embodiment of one shaft end 20a, at which a bearing journal 20b originates. This bearing journal 20b can be inserted into a third shaft bearing, not shown, so that a thus-refined shaft 11a provides a three-point bearing of the armature 10. This provision again counteracts elastic warping of the shaft 11a and thus is also a provision for noise abatement. On the other hand, the second shaft bearing could be assigned to this bearing journal 20b, so that then the armature 10 would be supported on only one side.

The foregoing relates to preferred exemplary embodiments of the invention, it being understood that other variants and embodiments thereof are possible within the spirit and scope of the invention, the latter being defined by the appended claims.

What is claimed is:

1. A motor-and-pump unit, comprising an electric motor, which has a motor housing with at least one end wall, a shaft, and at least one shaft bearing that is embodied as a ball bearing with an outer ball bearing race and an inner ball bearing race and with balls located between said outer and inner bearing races a pump beside the at least one end wall, the pump having at least one pump piston disposed displaceably transversely to the shaft, and an eccentric element that is driven by the shaft, the eccentric element is disposed in alignment with the pump piston and is seated firmly on one shaft end and forms a raceway for cylindrical roller bodies, and between the roller bodies and the pump piston, an outer roller bearing race encompassing the roller bodies is disposed, the eccentric element (31) and the inner ball bearing race (16) are embodied as a one-piece, tubelike, integral component.

2. The motor-and-pump unit according to claim 1, in which the outer ball bearing race (15) has a face end (19) toward the eccentric element (31), and that the outer roller bearing race (37) is guided along the face end (19) of the outer ball bearing race (15).

3. A motor-and-pump unit, comprising an electric motor, which has a motor housing with at least one end wall, a shaft, and at least one shaft bearing that is embodied as a ball bearing having an outer ball bearing race and an inner ball bearing race and with balls located between said outer and inner bearing races, wherein the outer ball bearing race is retained in a tubular bearing neck originating at the at least one end wall, a pump beside the at least one end wall, the pump having at least one pump piston disposed displaceably transversely to the shaft, and an eccentric element that is driven by the shaft disposed in alignment with the pump piston and is seated firmly on one shaft end and forms a raceway for cylindrical roller bodies, and between the roller bodies and the pump piston, an outer roller bearing race encompassing the roller bodies is disposed, the outer ball bearing race (15) has a face end (19) toward the eccentric element (31), and that the outer roller bearing race (37) is guided along the face end (19) of the outer ball bearing race (15).

4. The motor-and-pump unit according to claim 3, in which the eccentric element (31) and the inner ball bearing race (16) are embodied as a one-piece, tubelike, integral component.

* * * * *